(12) United States Patent
Secatch et al.

(10) Patent No.: US 12,019,898 B2
(45) Date of Patent: Jun. 25, 2024

(54) DATA STORAGE SYSTEM WITH WORKLOAD-BASED DYNAMIC POWER CONSUMPTION

(71) Applicant: Seagate Technology LLC, Fremont, CA (US)

(72) Inventors: Stacey Secatch, Niwot, CO (US); David W. Claude, Loveland, CO (US); Daniel J. Benjamin, Savage, MN (US); Thomas V. Spencer, Ft. Collins, CO (US); Matthew B. Lovell, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 281 days.

(21) Appl. No.: 17/490,199

(22) Filed: Sep. 30, 2021

(65) Prior Publication Data

US 2022/0100407 A1 Mar. 31, 2022

Related U.S. Application Data

(60) Provisional application No. 63/198,141, filed on Sep. 30, 2020.

(51) Int. Cl.
*G06F 3/06* (2006.01)
*G06F 9/50* (2006.01)

(52) U.S. Cl.
CPC .......... *G06F 3/0652* (2013.01); *G06F 3/0604* (2013.01); *G06F 3/0619* (2013.01); *G06F 3/0635* (2013.01); *G06F 3/0659* (2013.01); *G06F 3/0673* (2013.01); *G06F 9/5094* (2013.01); *G06F 2209/5022* (2013.01)

(58) Field of Classification Search
None
See application file for complete search history.

(56) References Cited

U.S. PATENT DOCUMENTS

| | | |
|---|---|---|
| 6,859,882 B2 | 2/2005 | Fung |
| 8,429,436 B2 | 4/2013 | Fillingim et al. |
| 9,292,060 B1 | 3/2016 | Marr et al. |

(Continued)

FOREIGN PATENT DOCUMENTS

| | | | | |
|---|---|---|---|---|
| WO | WO-2015023191 A1 | * | 2/2015 | ........... G06F 1/3206 |
| WO | WO-2020227295 A1 | * | 11/2020 | ......... G06F 12/0246 |
| WO | WO-2020257057 A1 | * | 12/2020 | ......... G11C 11/5635 |

OTHER PUBLICATIONS

X. Dong and Y. Xie, "AdaMS: Adaptive MLC/SLC phase-change memory design for file storage," 16th Asia and South Pacific Design Automation Conference (ASP-DAC 2011), Yokohama, Japan, 2011, pp. 31-36, doi: 10.1109/ASPDAC.2011.5722206, https://ieeexplore.ieee.org/document/5722206 (Year: 2011).*

(Continued)

*Primary Examiner* — Christopher D Birkhimer
(74) *Attorney, Agent, or Firm* — Hall Estill Law Firm

(57) ABSTRACT

A data storage system may have a data storage device with a memory arranged into a plurality of logical namespaces. A power module can be connected to the plurality of logical namespaces and configured to transition at least one memory cell in response to a workload computed for a namespace of the plurality of the logical namespaces to maintain a power consumption of 8 watts or less for the data storage device.

20 Claims, 8 Drawing Sheets

(56) References Cited

U.S. PATENT DOCUMENTS

| | | |
|---|---|---|
| 9,310,864 B1 | 4/2016 | Klein et al. |
| 9,405,356 B1 | 8/2016 | Sareen et al. |
| 9,946,481 B2 | 4/2018 | Warriner |
| 9,959,146 B2* | 5/2018 | Ahuja .................... G06F 9/5094 |
| 10,255,106 B2* | 4/2019 | Farazmand ............ G06F 9/5094 |
| 10,372,185 B2 | 8/2019 | Lester et al. |
| 10,664,324 B2* | 5/2020 | Gross .................... H04L 47/762 |
| 2012/0011506 A1* | 1/2012 | Iwamatsu ............. G06F 1/3215 |
| | | 718/1 |
| 2013/0124888 A1* | 5/2013 | Tanaka ................... G11C 16/34 |
| | | 713/320 |
| 2014/0063026 A1* | 3/2014 | Oh ......................... G06F 1/3203 |
| | | 345/519 |
| 2015/0236973 A1* | 8/2015 | Jackson .............. H04L 41/0894 |
| | | 709/226 |
| 2016/0116954 A1* | 4/2016 | Zhuang ..................... G06F 1/26 |
| | | 713/300 |
| 2016/0378149 A1* | 12/2016 | Kam ..................... G06F 1/3206 |
| | | 713/320 |
| 2018/0026906 A1* | 1/2018 | Balle ................... G06F 12/1408 |
| | | 709/226 |
| 2018/0074849 A1* | 3/2018 | Vanka ...................... G06F 9/505 |
| 2018/0307429 A1* | 10/2018 | Fu ......................... G06F 12/0897 |
| 2019/0102314 A1* | 4/2019 | Wang ..................... H04W 52/246 |
| 2019/0138227 A1* | 5/2019 | Yamamoto .............. G06F 3/064 |
| 2019/0164605 A1* | 5/2019 | Jeong .................... G06F 13/102 |
| 2019/0332164 A1* | 10/2019 | Sinha .................... G06F 1/3225 |
| 2020/0133898 A1* | 4/2020 | Therene .................. G06F 3/061 |
| 2021/0382643 A1* | 12/2021 | Muthiah ................ G06F 3/0616 |

OTHER PUBLICATIONS

Anonymous, "SSD: Components: Focus and NAND Flash Die", Sep. 19, 202, pp. 1-6, https://web.archive.org/web/20200919225732/ https://www.delkin.com/blog/ssd-components-focus-on-nand-flash-die/ (Year: 2020).*

* cited by examiner

DATA STORAGE SYSTEM WITH WORKLOAD-BASED DYNAMIC POWER CONSUMPTION

CROSS-REFERENCE TO RELATED APPLICATIONS

This application claims benefit under 35 U.S.C. 119(e) of U.S. Provisional Application Ser. No. 63/198,141, filed Sep. 30, 2020, which is hereby expressly incorporated herein by reference in its entirety.

SUMMARY

Various embodiments of the present disclosure are generally directed to the workload-based dynamic power consumption in a memory, such as, but not limited to, a flash memory in a solid state drive (SSD).

A data storage system, in some embodiments, has a data storage device with a memory arranged into a plurality of logical namespaces. A power module is connected to the plurality of logical namespaces and is configured to transition at least one memory cell in response to a workload computed for a namespace of the plurality of the logical namespaces to maintain a power consumption of 8 watts or less for the data storage device.

DETAILED DESCRIPTION

Figure 1:
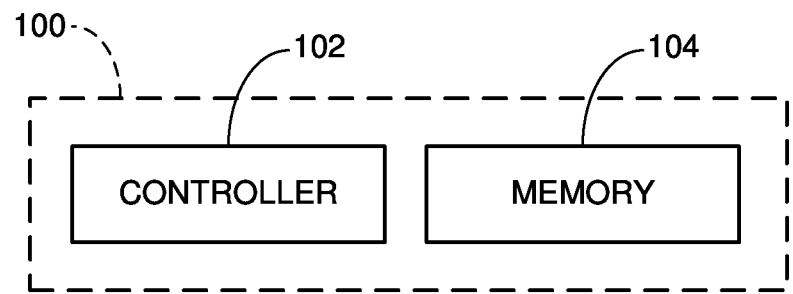
FIG. 1 provides a functional block representation of a data storage device in accordance with various embodiments.

Assorted embodiments discussed herein, without limitation, are directed to a data storage system that compute workloads to logical namespaces of memory cells and adjust power consumption to optimize the utilization of the logical namespaces.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into NVMe sets in accordance with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a forward map and a reverse directory, although other forms can be used.

The forward map provides an overall map structure that can be accessed by a controller to service a received host access command (e.g., a write command, a read command, etc.). The forward map may take the form of a two-level map, where a first level of the map maintains the locations of map pages and a second level of the map provides a flash transition layer (FTL) to provide association of logical addresses of the data blocks to physical addresses at which the blocks are stored. Other forms of maps can be used including single level maps and three-or-more level maps, but each generally provides a forward map structure in which pointers may be used to point to each successive block until the most current version is located.

The reverse directory can be written to the various GCUs and provides local data identifying, by logical address, which data blocks are stored in the associated GCU. The reverse directory, also sometimes referred to as a footer, thus provides a physical to logical association for the locally stored blocks. As with the forward map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs include a top level controller circuit and a flash (or other semiconductor) memory module. A number of channels, or lanes, are provided to enable communications between the controller and dies within the flash memory. The dies are further subdivided into planes, GCUs, erasure blocks, pages, etc. Groups of dies may be arranged into separate NVMe sets, or namespaces. This allows the various NVMe sets to be concurrently serviced for different owners (users).

In one nonlimiting example, a 4TB SSD has 128 die connected using 8 channels so that 16 die are connected to each channel. Each die has two planes that support concurrent read or write operations to the same page number (but not necessarily the same erasure blocks, EBs). GCUs nominally are formed using one EB from each of 32 dies. Each page stores 16K of data plus LDPC inner code values. GCU writes are thus formed by writing (nominally) 31 pages of user data, and one page of parity (XOR) data. This will support a loss of a single die. EBs represent the smallest increment of memory that can be erased as a unit, but in practice, garbage collection takes place at the GCU level.

Flash devices can be noisy and thus it is common to write data in the form of code words to individual pages of data. A page may store 16K worth of user payload data, plus some additional number of LDPC (low density parity check) codes, which may be on the order of an additional 5K or so bits. The number and strength of the LDPC codes are used to enable, normally, correct reading back of the payload. Outercode, or parity values, can additionally be written as noted above to correct read errors when the inner code values are insufficient to resolve the error.

Despite the ability to correct errors, the efficient utilization of memory in a solid-state data storage device remains important. With some solid-state memories having a finite lifespan tied to a number of read, write, and erase cycles, such as flash memory, the efficient utilization of memory cells is even more important. The logical division of memory into namespaces has allows object storage that is less rigid than physical division of memory, such as by device, die, plane, page, block, or range of physical block addresses (PBA). The use of namespaces can allow for increased controller customization of where data can be stored, and retrieved. However, simple logical namespaces can generate increased volumes of system processing that can degrade data storage performance.

The evolution of logical memory namespaces has progressed to having zoned namespaces where portions of memory are associated with sequential data writing and collaboration of local memory and host controller for data placement. The use of zoned namespaces can increase data storage efficiency by reducing write amplification, data over-provisioning, and volatile data buffer space consumed during the storage, and retrieval, of data in a memory. Zoned namespaces can be customized to provide increased write performance through streams, but zoned namespaces suffer from inconsistency and unreliability, particularly when a memory employs multiple physically separate die of memory cells, that is compounded by increasing pressure for data storage devices to consume less power.

With these issues in mind, embodiments of a data storage system employ a power module to determine the real-time workload for various logical namespaces and dynamically adapt power consumption to provide consistent data access performance with minimal consumption of power. The intelligent detection and analysis of data access activity in one or more memories of a data storage system allows for an efficient determination of current, pending, and future workloads to various logical namespaces. An accurate understanding of the workload of a namespace allows for the intelligent customization of data handling and/or data access operation to provide maximum data access performance for the least amount of electrical power consumption.

To achieve the goal of intelligent optimization of namespace power consumption based on detected workload, a power module can generate one or more workload strategies that set data activity triggers that prompt the proactive and/or reactive alteration of data access operation of various portions of a data storage system. The intelligent alteration of the operation of one or more portions of a data storage system results in seamless data access performance and reliability for connected hosts while consuming less power than if no data access alteration was conducted. Accordingly, the ability to customize data access operation in response to actual detected namespace workload ensures that system resources, such as processing and buffering, are utilized intelligently to provide reliable quality of service without unduly consuming power.

These and other features may be practiced in a variety of different data storage devices, but various embodiments conduct wear range optimization in the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices 106, such as other data storage devices, network server, network node, or remote controller.

Figure 2:
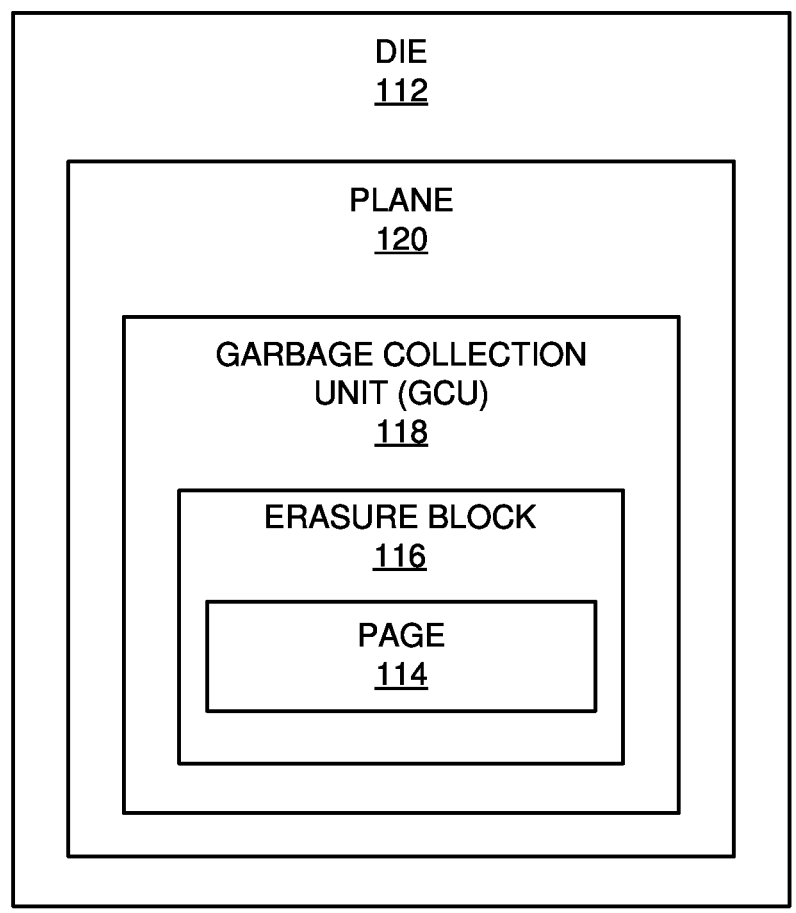
FIG. 2 shows aspects of the device of FIG. 1 characterized as a solid state drive (SSD) in accordance with some embodiments.

FIG. 2 shows a block representation of portions of an example memory 110 arranged in accordance with some embodiments. A memory die 112 can be configured with any solid-state memory cells, such as flash, resistive, phase change, and spin-torque memory, without limitation. The smallest unit of memory that can be accessed at a time is referred to as a page 114. A page 114 may be formed using a number of solid-state memory cells that share a common word line, bit line, or source line. The storage size of a page 114 can vary; current generation flash memory pages can store, in some cases, 16 KB (16,384 bytes) of user data.

A number of pages are integrated into an erasure block 116, which represents the smallest grouping of memory cells that can be concurrently erased in a NAND flash memory. A number of erasure blocks 116 can be arranged into a garbage collection unit (GCU) 118, which may utilize erasure blocks across different dies 112, as explained below. GCUs 118 can be allocated for the storage of data. Once a sufficient amount of the stored data is determined to be stale (e.g., no longer the most current version), a garbage collection operation can be carried out to recycle the GCU 118. This includes identifying and relocating the current version data to a new location, followed by an erasure operation to reset the memory cells. The GCU 118 may then be returned to an allocation pool for subsequent allocation to begin storing new user data.

Each die 112 may include a plurality of planes 120. Examples include two planes per die, four planes per die, etc. although other arrangements can be used. Generally, a plane is a subdivision of the die 112 arranged with separate read/write/erase circuitry such that a given type of access operation (such as a write operation, etc.) can be carried out simultaneously by each of the planes to a common page address within the respective planes.

Figure 3:
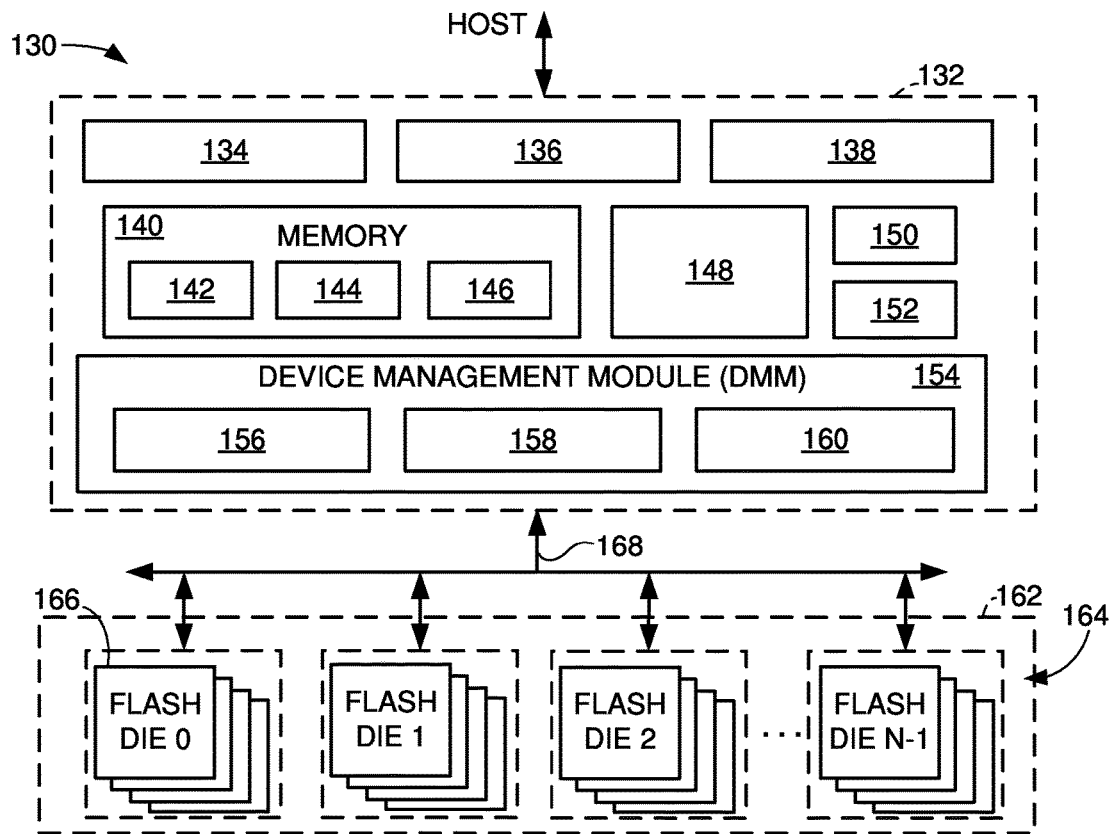
FIG. 3 shows an arrangement of the flash memory of FIG. 2 in some embodiments.

FIG. 3 depicts portions of an example data storage device 130 generally corresponding to the device 100 in FIG. 1. The device 130 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVMe sets (die sets) for use in the storage of data. Each NVMe set may form a portion of an NVMe Namespace that may span multiple SSDs or be contained within a single SSD.

The SSD 130 includes a controller circuit 132 with a front end controller 134, a core controller 136 and a back end controller 138. The front end controller 134 performs host I/F functions, the back end controller 138 directs data transfers with the memory module 134 and the core controller 136 provides top level control for the device.

Each controller 134, 136 and 138 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 140 represents various forms of volatile and/or non-volatile memory (e.g., SRAM, DDR DRAM, flash, etc.) utilized as local memory by the controller 132. Various data structures and data sets may be stored by the memory including one or more map structures 142, one or more caches 144 for map data and other control information, and one or more data buffers 146 for the temporary storage of host (user) data during data transfers.

A non-processor based hardware assist circuit 148 may enable the offloading of certain memory management tasks by one or more of the controllers as required. The hardware circuit 148 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 132, such as a data compression block 150 and an encryption block 152. The data compression block 150 applies lossless data compression to input data sets during write operations, and subsequently provides data de-compression during read operations. The encryption block 152 provides any number of cryptographic functions to input data including encryption, hashes, decompression, etc.

A device management module (DMM) 154 supports back end processing operations and may include an outer code engine circuit 156 to generate outer code, a device OF logic circuit 158 and a low density parity check (LDPC) circuit 160 configured to generate LDPC codes as part of the error detection and correction strategy used to protect the data stored by the by the SSD 130.

A memory module 162 corresponds to the memory 104 in FIG. 1 and includes a non-volatile memory (NVM) in the form of a flash memory 164 distributed across a plural number N of flash memory dies 166. Rudimentary flash memory control electronics (not separately shown in FIG. 3) may be provisioned on each die 166 to facilitate parallel data transfer operations via one or more channels (lanes) 168.

Figure 4:
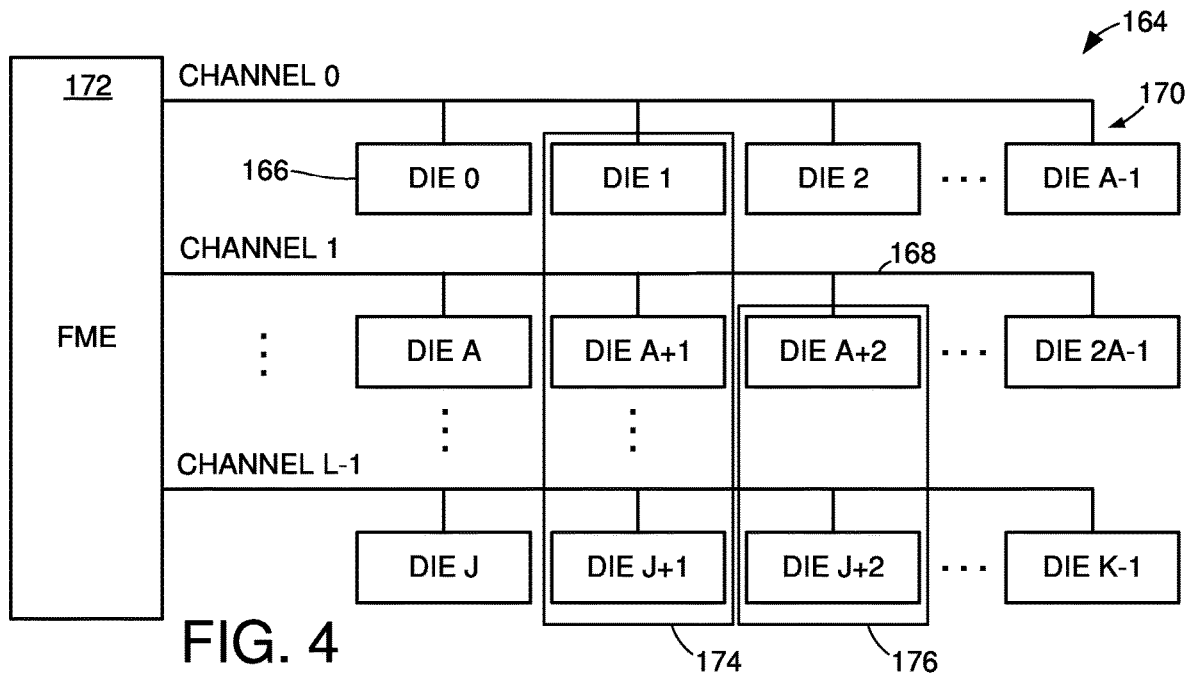
FIG. 4 illustrates the use of channels to access the dies in FIG. 3 in some embodiments.

FIG. 4 shows further aspects of the flash memory 164 arranged in accordance with some embodiments. A total number K dies 166 are provided and arranged into physical die groups 170. Each die group 170 is connected to a separate channel 168 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 172 of the flash memory 164 controls each of the channels 168 to transfer data to and from the dies 166.

In some embodiments, the various dies are arranged into one or more NVMe sets. An NVMe set represents a portion of the storage capacity of the SSD that is allocated for use by a particular host (user/owner). NVMe sets are usually established with a granularity at the die level, so that some percentage of the total available dies 166 will be allocated for incorporation into a given NVMe set.

A first example NVMe set is denoted at 174 in FIG. 4. This first set 174 uses a single die 166 from each of the different channels 168. This arrangement provides fast performance during the servicing of data transfer commands for the set since all eight channels 168 are used to transfer the associated data. A limitation with this approach is that if the set 174 is being serviced, no other NVMe sets can be serviced during that time interval. While the set 174 only uses a single die from each channel, the set could also be configured to use multiple dies from each channel, such as 16 dies/channel, 32 dies/channel, etc.

A second example NVMe set is denoted at 176 in FIG. 4. This set uses dies 166 from less than all of the available channels 168. This arrangement provides relatively slower overall performance during data transfers as compared to the set 174, since for a given size of data transfer, the data will be transferred using fewer channels. However, this arrangement advantageously allows the SSD to service multiple NVMe sets at the same time, provided the sets do not share the same (e.g., an overlapping) channel 168.

Figure 5:
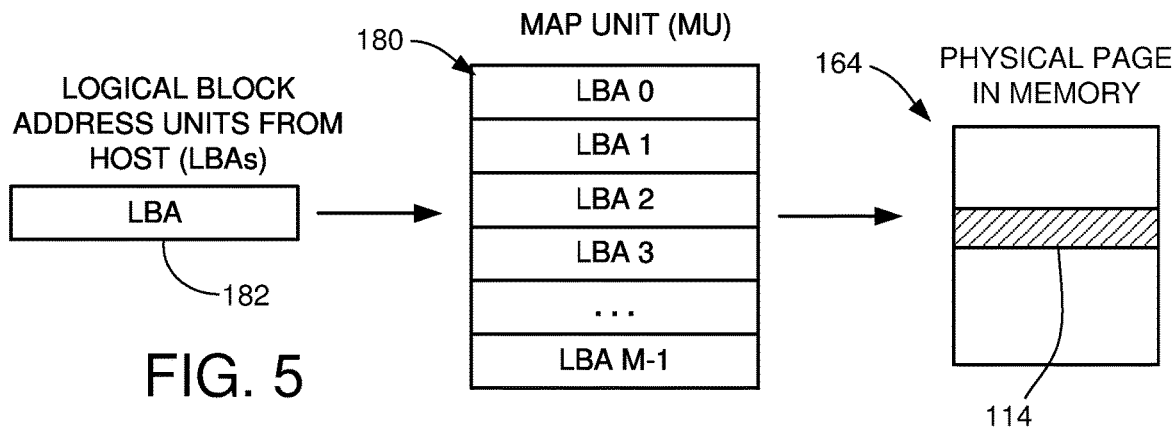
FIG. 5 illustrates a map unit (MU) as a data arrangement stored to the flash memory of FIG. 2.

FIG. 5 illustrates a manner in which data may be stored to a flash memory 164. Map units (MUs) 180 represent fixed sized blocks of data that are made up of one or more user logical block address units (LBAs) 182 supplied by the host. Without limitation, the LBAs 182 may have a first nominal size, such as 512 bytes (B), 1024B (1 KB), etc., and the MUs 180 may have a second nominal size, such as 4096B (4 KB), etc. The application of data compression may cause each MU to have a smaller size in terms of actual bits written to the flash memory 164.

The MUs 180 are arranged into the aforementioned pages 114 (FIG. 2) which are written to the memory 164. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 180) to enable the SSD 130 to locate the physical location of existing data. For example, during the servicing of a read command it is generally necessary to locate the physical address within the flash memory 166 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
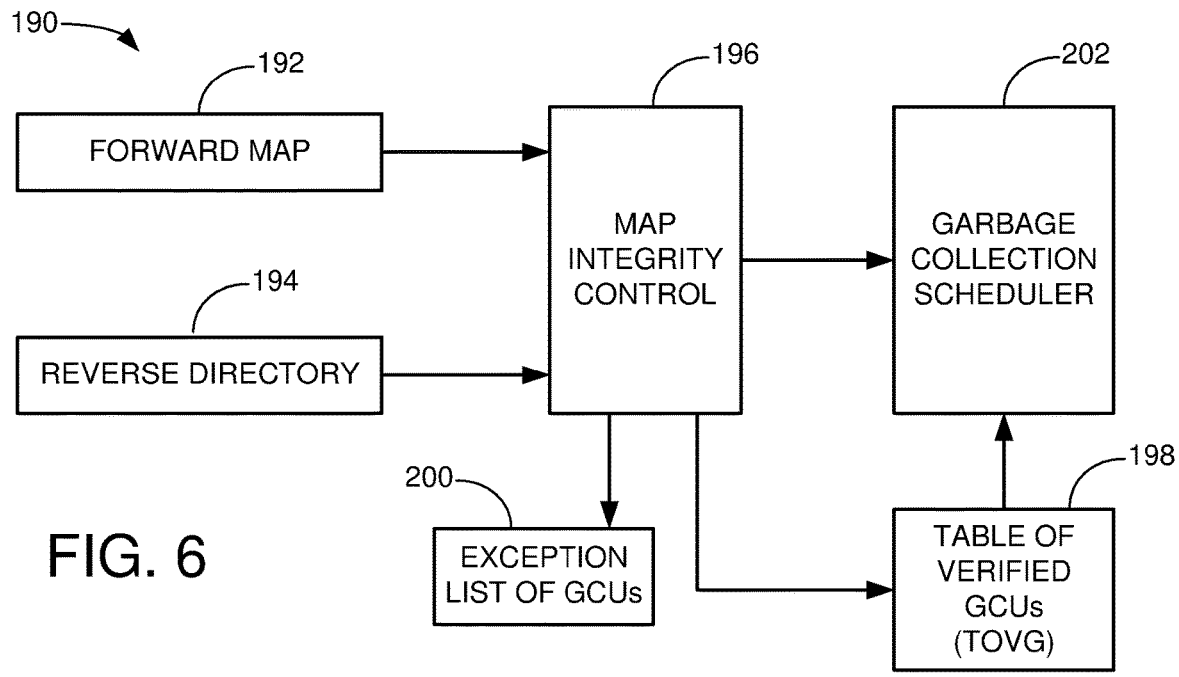
FIG. 6 displays a functional block diagram for a GCU management circuit of the SSD in accordance with some embodiments.

FIG. 6 shows a functional block diagram for a GCU management circuit 190 of the SSD 130 in accordance with some embodiments. The circuit 190 may form a portion of the controller 132 and may be realized using hardware circuitry and/or one or more programmable processor circuits with associated firmware in memory. The circuit 190 includes the use of a forward map 192 and a reverse directory 194. As noted above, the forward map and reverse directory are metadata data structures that describe the locations of the data blocks in the flash memory 164. During the servicing of host data transfer operations, as well as other operations, the respective portions of these data structures are located in the flash memory or other non-volatile memory location and copied to local memory 140 (see e.g., FIG. 3). The forward map 192 provides a flash transition layer (FTL) to generally provide a correlation between the logical addresses of various blocks (e.g., MUAs) and the physical addresses at which the various blocks are stored (e.g., NVMe set, die, plane, GCU, EB, page, bit offset, etc.). The contents of the forward map 192 may be stored in specially configured and designated GCUs in each NVMe set.

The reverse directory 194 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 190 further includes a map integrity control circuit 196. As explained below, this control circuit 196 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 198. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 196 find a mismatch between the forward map 192 and the reverse directory 194 for a given GCU, the control circuit 196 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 192 indicates that there should be some number X valid blocks in the selected GCU, such as 12 valid blocks, but the reverse directory 194 indicates that there are only Y valid blocks, such as 11 valid blocks, and the 11 valid blocks indicated by the reverse directory 194 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 200 may be formed as a data structure in memory of GCUs that have been found to require further evaluation. In this way, the GCUs can be evaluated later at an appropriate time for resolution, after which the corrected GCUs can be placed on the verified list in the TOVG 198.

It will be noted that the foregoing operation of the control circuit 196 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the GCU management circuit 190 to include a garbage collection scheduler circuit 202. This circuit 202 generally operates once it is appropriate to consider performing a garbage collection operation, at which point the circuit 202 selects from among the available verified GCUs from the table 198. In some cases, the circuit 202 may generate a time of completion estimate to complete the garbage collection operation based on the size of the GCU, the amount of data to be relocated, etc.

As will be appreciated, a garbage collection operation can include accessing the forward map and/or reverse directory 192, 194 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
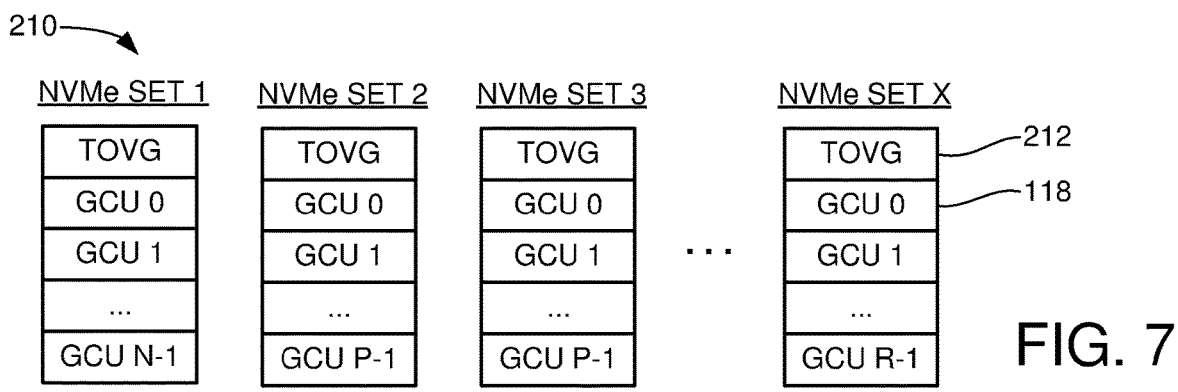
FIG. 7 represents an arrangement of various GCUs and corresponding tables of verified GCUs (TOVGs) for a number of different NVMe sets in some embodiments.

FIG. 7 shows a number of NVMe sets 210 that may be arranged across the SSD 130 in some embodiments. Each set 210 may have the same nominal data storage capacity (e.g., the same number of allocated dies, etc.), or each may have a different storage capacity. The storage capacity of each NVMe set 210 is arranged into a number of GCUs 118 as shown. In addition, a separate TOVG (table of verified GCUs) 212 may be maintained by and in each NVMe set 210 to show the status of the respective GCUs. From this, each time that it becomes desirable to schedule a garbage collection operation, such as to free up new available memory for a given set, the table 212 can be consulted to select a GCU that, with a high degree of probability, can be subjected to an efficient garbage collection operation without any unexpected delays due to mismatches in the metadata (forward map and reverse directory).

Figure 8:
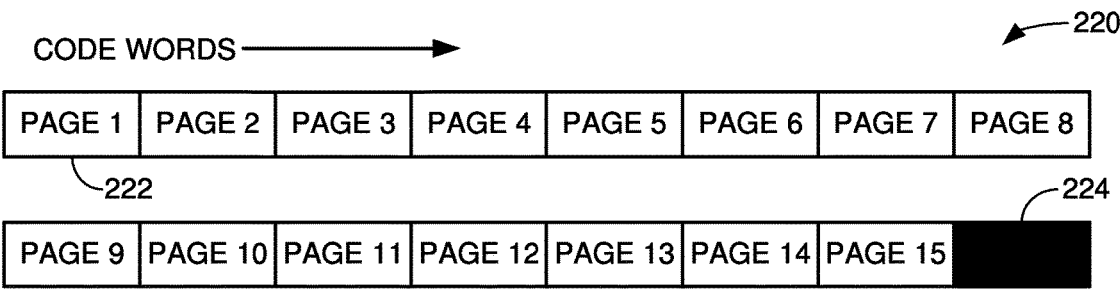
FIG. 8 illustrates an example data set that can be written to the data storage device of FIG. 1 in accordance with assorted embodiments.

FIG. 8 illustrates a manner in which a parity data set 220 can be written to a selected GCU 118 in the flash memory 164 in accordance with some embodiments. In this example, it is contemplated that the selected GCU 118 is formed from sixteen (16) erasure blocks 116, with each of the erasure blocks disposed on a different die 166. Other sizes can be used as desired.

In FIG. 8, the parity data set has fifteen (15) user data pages 222, with each user data page, or payload, written to a different one of the dies. More generally, the GCU has N erasure blocks on a corresponding N dies, and payloads 222 are written to N−1 of the dies. The Nth die receives an outer code (parity value), which is represented at 224. As mentioned above, the outer code may be generated by summing the page data in a buffer using an XOR function. Because the parity data set 220 has data boundaries that nominally match the GCU boundaries, the parity data set in FIG. 8 is referred to as a standard parity data set since the data matches the available memory.

Figure 9:
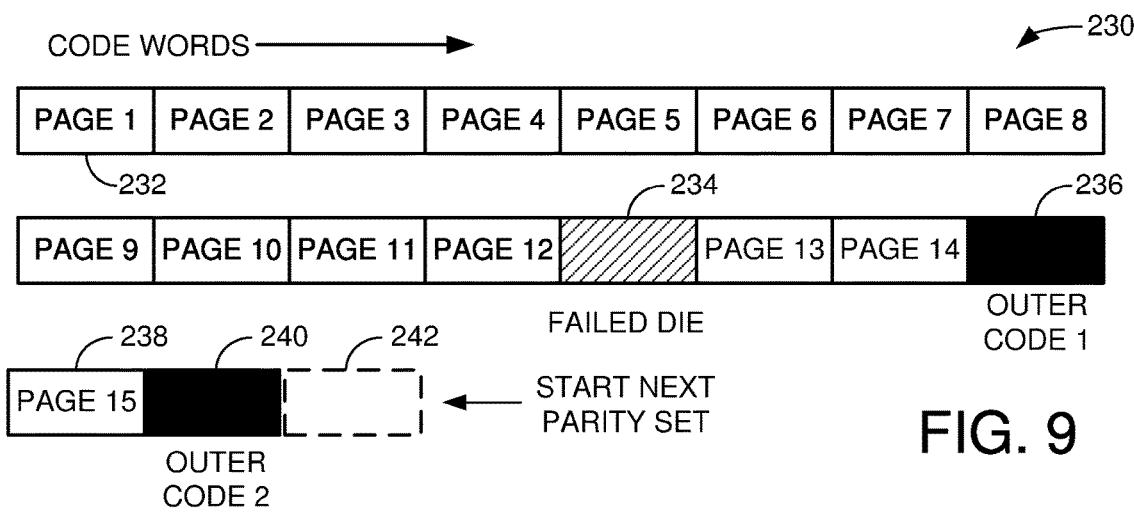
FIG. 9 is an example non-standard data set that may occur in the data storage device of FIG. 1 in accordance with various embodiments.

FIG. 9 shows an example non-standard parity data set 230. The parity data set 230 is the same size as the parity data set 220 in FIG. 8 in that, as before, the parity data set 230 has a total of fifteen (15) pages/payloads 232. However, one of the dies 166 has experienced a failure, as indicated at 234, so that the GCU only spans 15 dies.

Accordingly, the controller circuit 132 (FIG. 3) operates to write a full set of the available pages, which in this case is Page 1 to Page 14, through the available dies. This is followed by the writing of a first outer code (parity value) in the Nth location, as shown at 236, which protects the payloads (Page 1 to Page 14) written during this first pass through the available dies.

A leftover payload 238 (Page 15) is written to the next available page in the first die (such as adjacent Page 1). This leftover payload is referred to as a runt or runt data, and represents the remainder after an integer number of passes have been made through the available dies. Once all of the leftover payloads have been written, a second outer code (parity value) is written in the next available die, as shown at 240. This second outer code is disposed in the same die as, and is adjacent to, the Page 2 payload.

In this way, when leftover (runt) payload sets remain, these are written to as many additional dies as are required, followed by the writing of a final parity value to cover the runts. Map data may be generated to note the non-standard outer code arrangement. This provides a parity data set with a parity value to protect each pass through the dies, plus another parity value to cover the remainder.

While FIG. 9 shows the non-standard parity data set has arisen due to a non-standard sized available memory (e.g., due to the die failure at 234), other non-standard parity data sets can arise based on other factors. For example, a particular data set to be written to a given NVMe set may make up a total number of MUs that do not align with the GCU boundaries. In another case, data compression or other processing may result in a non-standard sized parity data set. It will be appreciated that if a given GCU has N dies, then a non-standard sized data set will have a total number M payloads (or portions thereof) that are not divisible by N without a remainder. The remainder could be any value from one extra payload up to N−1 extra payloads. Regardless, each pass through the dies will be parity protected, irrespective of the overall length of the parity data set.

Once a non-standard parity set is written, map data may be generated and stored to indicate the fact that the parity data set is of non-standard length. Information may be stored in the map data such as how much longer the data set is in terms of additional pages in the remainder, the location of the last parity value (e.g., 240), etc. To maximize data density, the controller may operate to initiate the writing of the next parity data set at the next available page on the next die in the sequence, as shown at 242 in FIG. 9.

Figure 10:
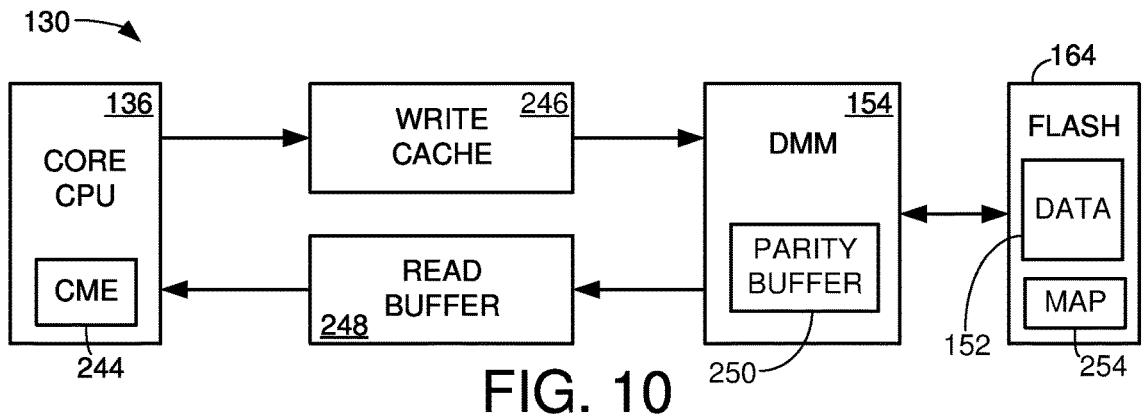
FIG. 10 shows a functional block representation of an example data storage device configured in accordance with some embodiments.

FIG. 10 shows a functional block representation of additional aspects of the SSD 130. The core CPU 136 from FIG. 3 is shown in conjunction with a code management engine (CME) 244 that can be used to manage the generation of the respective code words and outer code parity values for both standard and non-standard parity data sets During write operations, input write data from the associated host are received and processed to form MUs 180 (FIG. 5) which are placed into a non-volatile write cache 246 which may be flash memory or other form(s) of non-volatile memory. The MUs are transferred to the DMM circuit 154 for writing to the flash memory 164 in the form of code words that contain user data, inner code, and outer code. During read operations, one or more pages of data are retrieved to a volatile read buffer 248 for processing prior to transfer to the host.

The CME 244 determines the appropriate inner and outer code rates for the data generated and stored to memory. In some embodiments, the DMM circuit 154 may generate both the inner and outer codes. In other embodiments, the DMM circuit 154 generates the inner codes (see e.g., LDPC circuit 160 in FIG. 3) and the core CPU 136 generates the outer code words. In still other embodiments, the same processor/controller circuit generates both forms of code words. Other arrangements can be used as well. The CME 244 establishes appropriate code rates for both types of code words.

During generation of the outer codes, a parity buffer 250 may be used to successively XOR each payload being written during each pass through the dies. Both payload data 252 and map data 254 will be stored to data locations in flash 164.

Figure 11:
FIG. 11 displays a block representation of portions of an example data storage device arranged in accordance with assorted embodiments.
Figure 11:
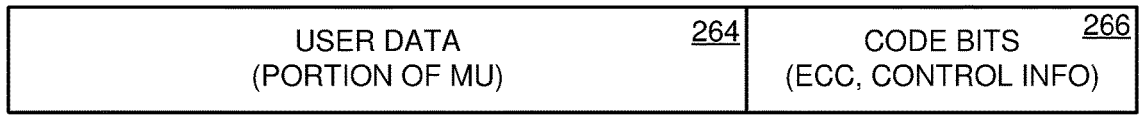

FIG. 11 is a block representation of portions of an example data storage device 260 in which data is arranged into a plurality of code words 262 that can efficiently be stored, and retrieved, from one or more SSD storage destinations. A page 150 of data may comprise a number of consecutive, or non-consecutive, code words 262 organized to effectively fit in the available space of an SSD.

As shown, a code word 262 can consist of user data 264 and inner code 266 generated to complement the user data 264, such as by the LDPC circuitry 138. The inner code 266 can provide a diverse variety of capabilities, such as error correction via error correction code (ECC), data status, data offset, and other data control information. The combination of user data 264 and inner code 266 together in a code word 262 allows for efficient analysis, verification, and correction (if necessary) of errors in reading, or writing, the user data 264 to/from memory. However, the inner code 266 may be insufficient, in some cases, to overcome and/or correct errors associated with storage of the code word 262. Hence, various embodiments generate outer code that provides higher-level data analysis and correction in complementary fashion to the inner code 266.

Figure 12:
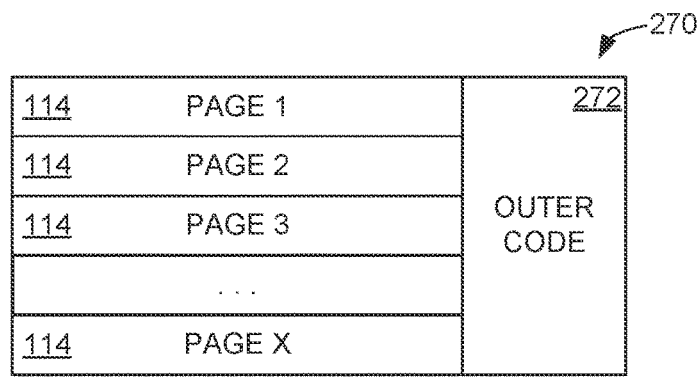
FIG. 12 shows a block representation of portions of an example data storage device configured in accordance with various embodiments.

FIG. 12 conveys a block representation of a portion of an example data storage device 270 where pages 150 of code words 262 are stored in combination with outer code 272 in accordance with some embodiments. The outer code 272 may be associated with one or more pages 150 of code words to provide data that describes the constituent code words 262 and allows for verification and correction of the accuracy, and reliability, of the user data of the respective code words 262.

It is contemplated that the outer code 272 can operate to correct errors and faults that occur during the reading, or writing, of the code words 262. Such corrective function of outer code 272 allows user data to be retrieved despite encountered errors/faults that were uncorrectable by inner code 266. In some embodiments, a probation counter for the user data and/or the physical address of memory where the user data 264 is stored is maintained in the inner code 266, outer code 272, or elsewhere in memory to allow a physical address and/or user data to be monitored in real-time with simple polling of the probation counter.

The ability to correct and recover from encountered error during data access operations to a memory provides additional longevity and reliability for a memory and the data stored therein. However, this ability comes at a relatively high system resource price as processing, storage capacity, and time are expended to correct errors and recover data. The use of such system resources can jeopardize the data storage and retrieval performance for some, or all, of a distributed data storage system. Regardless of the sophistication, efficiency, or accuracy of error/failure recovery in a data storage device, the inefficient retrieval of stored data can jeopardize the performance of a data storage device as well as reduce the operational lifespan of the memory constituent in the device.

Figure 13A:
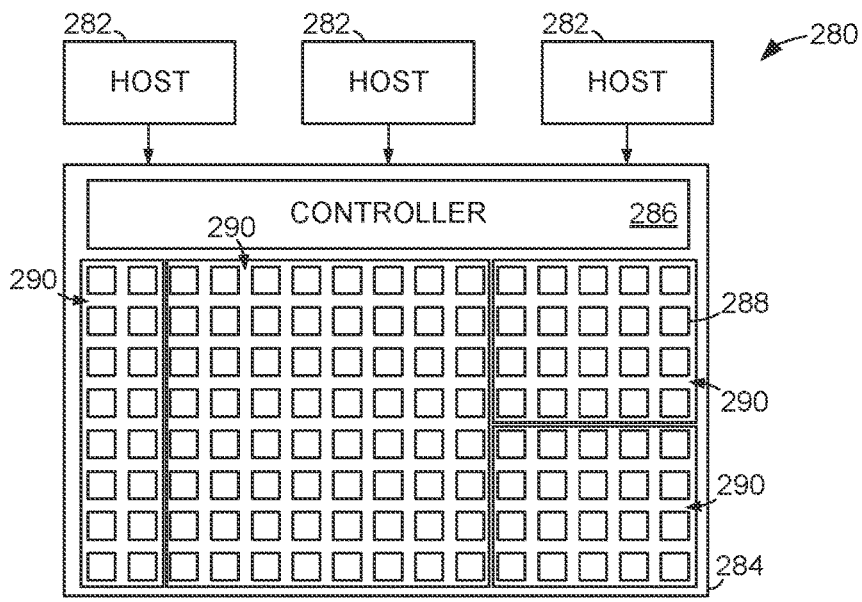
FIGS. 13A and 13B respectively depict block representations of assorted portions of example data storage systems that can be utilized in accordance with some embodiments.
Figure 13B:
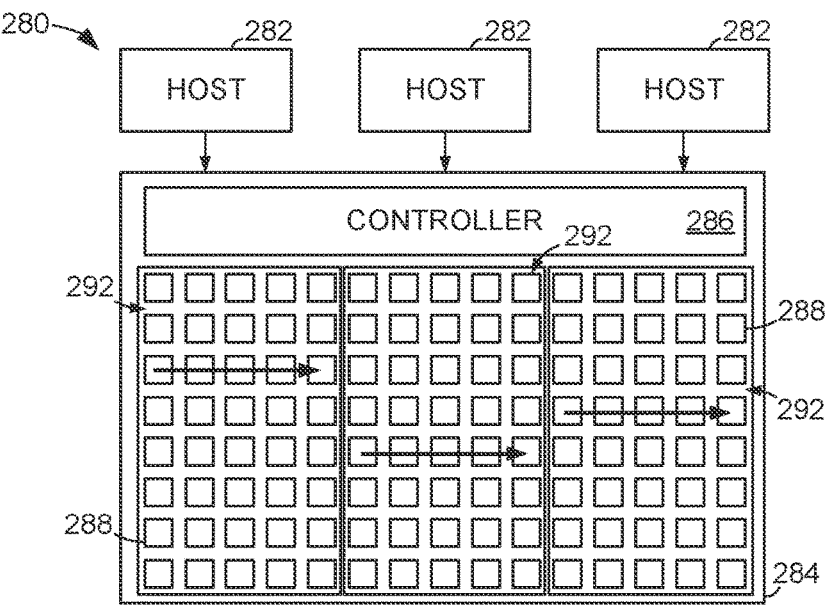

FIGS. 13A and 13B respectively depict portions of an example data storage system 280 arranged and utilized in accordance with assorted embodiments. The system 280 of FIG. 13A shows how multiple separate hosts 282 are connected to a data storage device 284 that employs a local drive controller 286 to direct data accesses in one or more memory cells 288. It is noted that the data storage system 280 can employ any number of hosts 282 connected to one or more data storage devices 284 via any number of wired and/or wireless connections.

The drive controller 286 can organize the assorted memory cells 288 into various logical namespaces 290 that can span any physical memory cell configuration, such as one or more platters, die, planes, or pages. The various namespaces 290 can provide selective writing of data, which can be utilized for dedicated streaming of data from one or more hosts, wear-leveling of data across amongst available memory cells 288, and reduced data access latency in some situations. However, the generation and maintenance of namespaces 290 can increase write amplification and mapping cache needs in addition to greater volumes of over-provisioning space.

FIG. 13B conveys how the data storage system 280 can be logically arranged into zoned namespaces 292 that involve protocol to sequentially write data from the beginning data block address of each zone 292 without the ability to overwrite or erase anything but an entire zone 292, as illustrated by arrows. The logical namespaces 292 provide the ability to allow a host 282 direct access to portions of memory, which can reduce latency while increasing data throughput and cost efficiency. Compared to non-zoned namespaces 290, zoned namespaces 292 allow for separate host workloads with less over-provisioning and write amplification. Yet, the treatment of a zoned namespace 292 as a collective data unit that must be sequentially written and only erased as a whole increases front-end processing and buffer space for data accesses, mapping, and organization.

The logical organization of memory cells 288 into namespaces 290/292, particularly zoned namespaces 292, can create processing and implementation difficulties when the namespace 292 spans physical block addresses of cells 288 located in separate locations, such as different data storage devices or die of a single data storage device. For instance, the erasing of the entirety of a zoned namespace 292 spanning separate physical block addresses can involve different channels, memory cell 288 maintenance operations, and delays compared to a namespace 292 located in a single physical memory, such as a single die or plane of cells 288.

Figure 14:
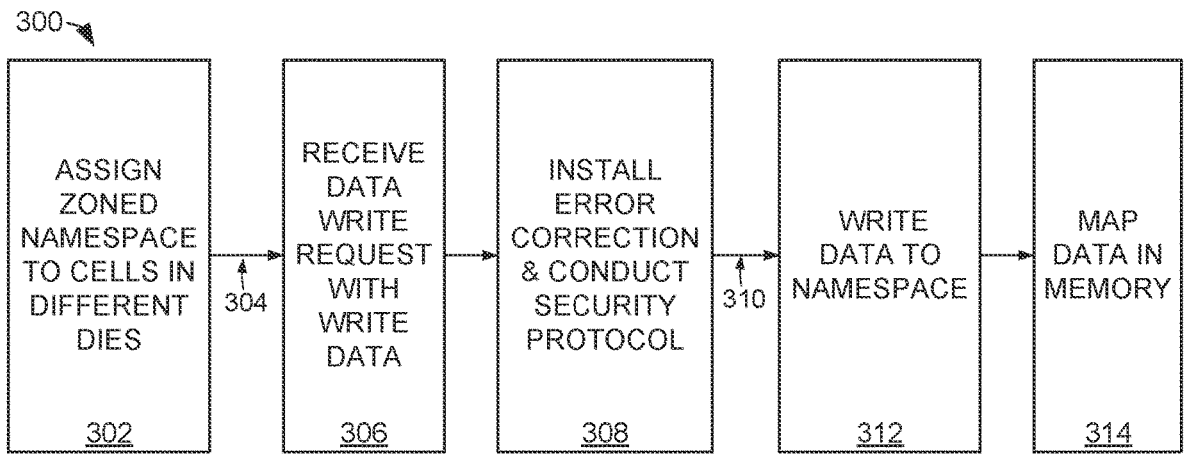
FIG. 14 depicts a timeline of an example power consumption procedure that may be employed by some embodiments of a data storage system.

FIG. 14 depicts an example power consumption procedure 300 illustrating how utilization of zoned namespaces spanning physically separate memory cell regions poses challenges for power consumption of a data storage device and system. A data storage system is connected and initialized prior to step 302 assigning a zoned namespace to memory cells spanning separate dies of at least one data storage device.

It is contemplated that one or more hosts can be connected to a zoned namespace. During various times when portions of the data storage system are in a power consuming event, such as too much power being consumed, memory cells being too hot, or data access performance being degraded due to a lack of power, some memory cells, such as an entire device, die, plane, or block, can be deactivated, or otherwise turned to a reduced power mode in action 304. Such deactivation can last for milliseconds to minutes while the system receives one or more data write requests in step 306 that is associated with data that is buffered until a data storage controller, such as a drive controller and/or upstream network controller, compiles enough write data to sequentially write a sufficient amount of a namespace. That is, step 306 can be cyclically conducted until a storage controller has enough buffered data to fill an adequate amount of a namespace, such as at least half or all of the physical block addresses of the namespace. While less than half a namespace can be written to at one time, the requirement to erase/overwrite the entirety of a namespace means a sparsely written namespace is inefficient and wasteful.

When a sufficient amount of data is buffered, step 308 installs error correction for the data and conducts security protocol, which may involve compression and/or encryption. In the event the requested write data is destined for memory cells that have been deactivated in action 304, action 310 returns at least some memory cells to active status before the data is sequentially written to the namespace in step 312 and the location of the data is mapped in step 314. Although the deactivation and subsequent activation of memory cells can provide temporary reduced power consumption, the processing overhead and power consumed in returning deactivated cells to an active state can be unacceptably expensive, particularly for hyper-scale systems employing large numbers of data storage devices concurrently. Hence, the increased processing and power needed to return cells to an active state, along with the delay in system operation associated with slow time-to-ready for the deactivated cells, poses significant challenges for consistent data access performance coinciding with reduced power consumption.

In addition, the waiting for enough data to fill a namespace, installing error correction, conducting security protocol, and mapping of data each contribute to the front-end processing and delays associated with utilizing zoned namespaces. As such, the reduction of over-provisioning space and write amplification with zoned namespaces can be diminished, from a performance optimization standpoint, by the inefficiency of having static policies involving the size, position and activation of memory cells in zoned namespaces as well as with how data accesses to, and from, a zoned namespace is conducted.

Figure 15:
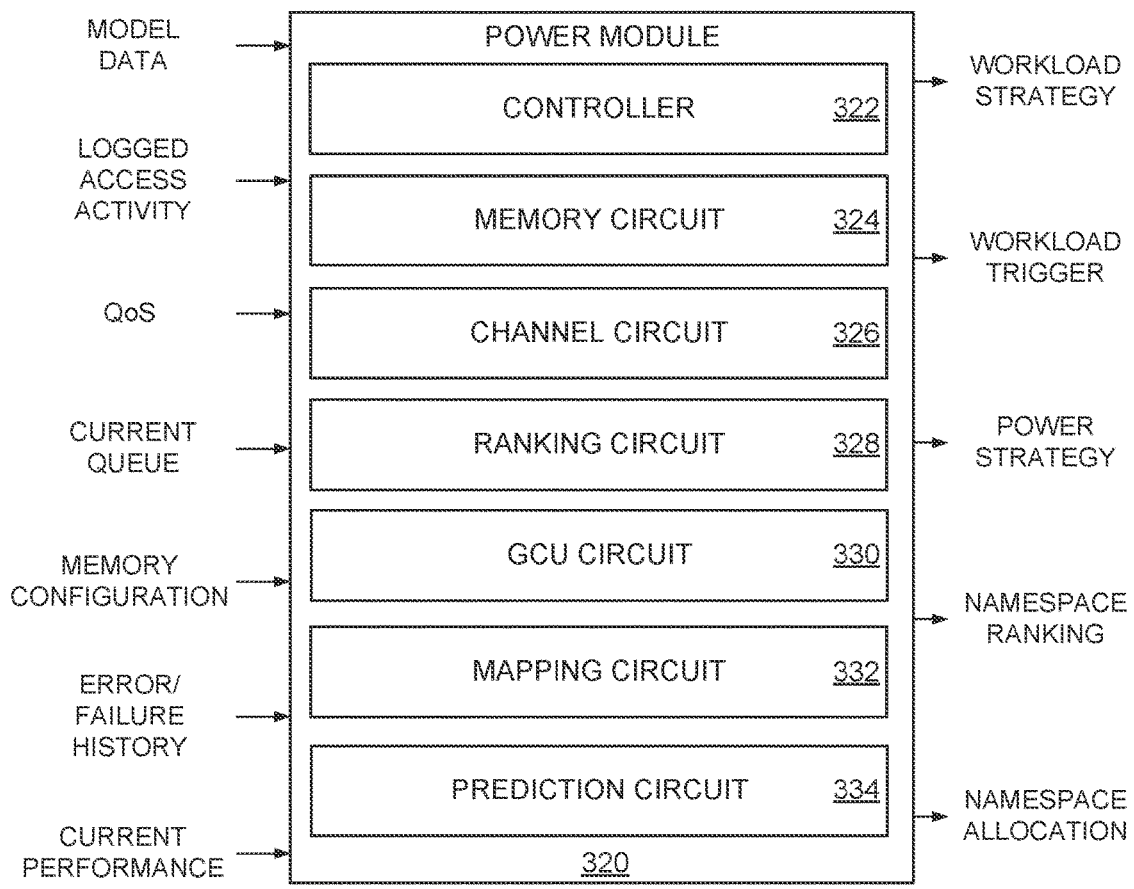
FIG. 15 depicts a block representation of an example power module that can be utilized in various embodiments of a data storage system.

Assorted embodiments of a data storage system address these challenges by employing a power module to dynamically alter namespace operation to provide consistent data access performance along with reduced power consumption that is seamless to the various hosts of the system. FIG. 15 depicts a block representation of an example power module 320 that can be operated in accordance with various embodiments to optimize zoned namespace performance. The module 320 can utilize one or more controllers 322 to translate a variety of input information into at least a workload detection strategy, a workload trigger, and a namespace optimization strategy. The module controller 322 may be a standalone circuit, such as a microprocessor or other programmable circuitry, resident anywhere in a data storage system, such as in a standalone node, network node, host, or data storage device.

Regardless of where a controller 322, and module 320, is located in a data storage system, the data access activity to one or more memories can be monitored and logged along with the current memory configuration, security protocol, quality of service criteria, and data locations. The module controller 322 can input past logged information, such as error rate, data access latency, location of stale data, and garbage collection activity. While current and past information about the data storage system in which the module 320 is resident can be procured, the controller 322 may additionally refer to one or more data models pertaining to other data storage systems, memories, or host access activity.

While not limiting, the power module 320 can input assorted current and past logged conditions for one or more memories of a data storage system. For instance, the current physical block addresses of various calibration groups, the addresses of past data access errors and failures, the current physical and logical configurations of memory cells, and the pending data operations to the memory cells can be utilized individually, and collectively, to understand current namespace configurations and performance as well as future cell arrangements for namespace optimization.

The power controller 322 can operate alone to generate and maintain the various strategies to control current and future namespace workloads, configurations, and data access operations. However, some embodiments employ assorted circuitry to aid the power controller 322 in efficiently creating, altering, and executing the respective output strategies, data access throttling, and memory cell allocations in namespaces. As shown, a memory circuit 324 can contribute to a power strategy that alters the operation of at least one namespace to provide predetermined power consumption changes for a memory. The memory circuit 324 can generate and maintain one or more logs of data access activity and memory operations that can be pertinent to identifying current, pending, and future workloads to various zoned namespaces.

The memory circuit 324 can set, and alter, the metrics which it logs over time and the granularity for which those metrics are tracked. For instance, the temperature for a memory cell can initially be logged by the memory circuit 324 before altering the granularity of the temperature tracking to a per-die or per-plane basis, as directed by the power controller 322 and at least one predetermined strategy. Another non-limiting example of the memory circuit 324 logs data access type and frequency to identify if a namespace is hot or cold with respect to host data access requests, which allows the power controller 322 to assign a workload evaluation for a namespace that represents how much activity a namespace is experiencing. It is noted that the memory circuit 324 may determine various types of workload for assorted data storage system namespaces, such as volume of data accesses over time, amount of processing overhead consumed by accesses to a namespace, or volume of available namespace memory occupied by valid, current user-generated data.

The monitoring of data access and memory activity to determine namespace workloads allows the memory circuit 324, in combination with the module controller 322, to generate and maintain a workload strategy that sets one or more workload trigger events that correspond with reactive and/or proactive alterations to current namespace operational policy. That is, a workload strategy can comprise a number of different workload trigger events, such as number of errors, available memory, volume of processing available, or number of memory cell accesses over time, that prompt the execution of one or more namespace operational policy alterations, as prescribed in the workload strategy, to maintain, mitigate, or reduce the workload on a namespace. The identification and control of namespace workloads allows the power module 320 to optimize namespace electrical power utilization by customizing how data accesses are conducted to the assorted namespaces of a data storage system.

In addition to the workload strategy, the module controller 322 can generate and maintain a power strategy that is directed at providing a balance of electrical power consumption with data read and/or write performance that meets a predetermined Quality of Service (QoS) standard, deterministic input/output window, or performance threshold. The ability to conduct namespace power consumption changes with the power strategy while the workload strategy identifies and controls the workload actually experienced by assorted logical namespaces of a data storage system allows the power module 320 to intelligently adapt to changing memory and data access activity to continually provide performance in accordance with predetermined expectations while consuming minimal amounts of electricity and producing minimal amounts of heat.

As an example operation of the memory circuit 324 via the power strategy, the power controller 322 can classify memory cells, such as pages, blocks, planes, and die, by power consumption and operational performance. For instance, the memory circuit 324 can determine a ratio of how much data access performance and reliability can be achieved by storing data to a particular portion of memory compared with how much electrical power will be consumed by that memory. Such characterization of memory cells for data access performance compared to power consumption and heat production allows the power strategy to prescribe reactive and/or proactive operational namespace alterations that change an operational parameter of at least one memory cell. A non-limiting example involves the memory circuit 324 prescribing a memory operational parameter alteration in a power strategy that adjusts the reference voltage for at least one memory cell and/or transitions a memory cell to a different level of logical storage, such as a multi-level cell (MLC) concurrently storing two or more logical states to a single level cell (SLC) storing one logical state at a time.

The proactive and/or reactive alteration of memory cell operation allows the power strategy to be conducted with practical results with respect to power consumption. The intelligent execution of a power strategy by the power module 320 further provides optimization of data access performance with minimal power consumption and heat production by memory cells of a memory.

The power module 320 may additionally prescribe alterations to the use of hardware channels that interconnect memories of a data storage device/system to provide an intelligent balance of power consumption with data access performance. A channel circuit 326 can evaluate the configuration and performance of various hardware channels to determine how electrical power is consumed and what data access performance is produced from such consumption. Such evaluation allows the channel circuit 326 to prescribe direct and/or indirect throttling of various system channels as part of a power strategy. With direct throttling, the channel circuit 326 can prescribe intentional delays, or deactivations, of one or more hardware channels for a range of time. Indirect throttling can be achieved by diverting activity to hardware channels utilizing more electrical power and/or provides greater data access performance bandwidth, which reduces the available amount of power for other hardware channels and reduces the data access performance of those channels. The assorted namespaces, hardware channels, and memory cells can be ranked by a ranking circuit 328 to allow the power strategy to efficiently execute prescribed operational modifications to the most intelligent aspects of a data storage system. For example, the ranking circuit 328 can create multiple rankings for the power consumption compared to data access performance of namespaces as a whole, constituent memory cells, data storage devices, and/or hardware channels, which provides the power strategy with dynamic reactions to detected, or predicted, namespace workloads. Hence, the association of predetermined data access operation alterations from a power strategy to change the amount of power being consumed is optimized by ranking the location and order of the prescribed power consumption changing actions. As a result, the module controller 322 can simply execute the prescribed operational changes from the power strategy on the current, or predicted, rankings of a particular granularity, such as by device, memory, die, plane, or block or memory.

It is contemplated that the ranking circuit 328 can place power consumption versus data access performance values for various logical data address associations, such as garbage collection units (GCU), namespaces, and virtual machines. A GCU circuit 330 can be utilized by the power module 320 to evaluate current and potential garbage collection unit configurations to produce power consumption profiles that provide an optimal balance of data access performance and power being consumed. The GCU circuit 330 can dictate the size, location, and use of various garbage collection units so that a power strategy can efficiently pivot the logical associations of data addresses in response to changes in namespace workloads.

A mapping circuit 332 may provide the power module 320 with the current power consumption information for some, or all, of a data storage device. The mapping circuit 332 can translate assorted current memory performance and/or data access activity to generate a power map associating physical, and/or logical, data addresses with the amount of power being consumed. The mapping circuit 332 may produce multiple power consumption maps corresponding with different namespace workloads, which allows the power module 320 to identify where prescribed power consumption altering actions are most efficiently carried out, and in what order. In other words, the mapping circuit 332, along with the ranking circuit 228, can provide real-time power consumption versus data access performance information at a variety of different granularities that allow the actions prescribed in the power strategy to be intelligently implemented to provide the most efficient adaptations to namespace workload changes over time.

Through the intelligent allocation of memory, the power module 320 can provide consistent, reliable data storage and retrieval performance for a namespace. The ability to reactively and/or proactively send data to memory cells having varying performance allows the module 320 to intelligently position data to withstand changing data access conditions due to varying memory characteristics and/or data access activity. The generation of assorted aspects of the workload and power strategies can provide sophisticated reactions to encountered namespace workloads as well as proactive actions that mitigate namespace data access performance degradation and power consumption when conditions and/or activity change.

The proactive generation of the workload and power strategies by the power module 320 allows the module controller 322 to execute workload and namespace power consumption control actions quickly and efficiently once a workload trigger is reached. In contrast, purely reactive generation of power manipulation actions by the power module 320 would involve additional processing and time to evaluate and generate the proper action(s) to establish workload control and provide continued namespace data access performance to satisfy one or more predetermined expectations. While the saving of processing overhead, the configuration of the respective workload and power consumption strategies with both reactive and proactive actions provide intelligent long-term namespace optimization that cannot be achieved with static namespace utilization policies or purely reactive generation of action(s) to control and optimize the amount of power a namespace consumes in view of workload.

The generation of proactive actions and identifying future workload and namespace operational performance for the respective strategies is aided by a prediction circuit 334. A prediction circuit 334 can input assorted current and past operations, actions, and activity, along with model data from other memory, to forecast at least one future namespace operational condition, power consumption, data access request, or data access performance. The accurate prediction of memory and namespace conditions along with data access performance allows the respective strategies generated by the power module 320 to have namespace operational policy adaptations to mitigate, or completely avoid, a forecasted future operational occurrence and/or a power consumption state. The prediction circuit 334 can further forecast how long different strategy actions will take for varying system conditions, which allows the module 320 to quickly adjust between different namespace actions to provide a practical workload control and maintain namespace operational performance within power consumption expectations without unduly stalling or degrading overall data storage system performance.

Figure 16:
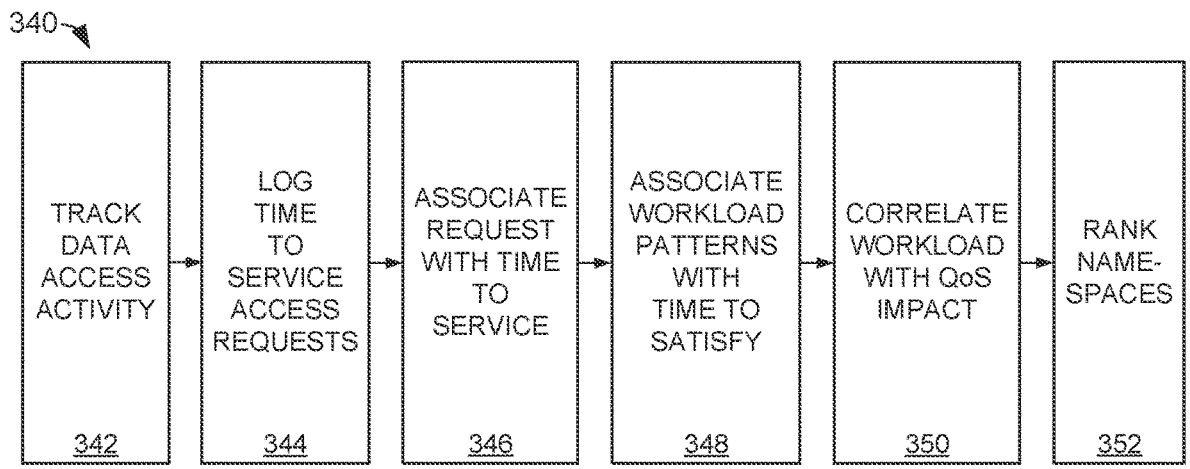
FIG. 16 depicts a timeline of an example workload detection procedure executed in accordance with assorted embodiments.

FIG. 16 depicts an example workload detection procedure 340 that can be carried out in a data storage system via a power module in accordance with various embodiments. Data accesses are tracked in step 342 by the power module. As such, the power module can track assorted data access metrics concurrently or sequentially. The overall time to service a data access request is logged by the power module in step 344. It is noted that the overall time to satisfy a data access request is not the only activity tracked in 342, but such activity tracking can be prioritized by redundantly monitoring and interpreting the elapsed time from submission of a data access request by a host to the return of data, in the case of a read request, or the writing of data to a namespace, in the case of a write request.

The logged time to service a data access request can be evaluated in isolation or with the service times of other data access requests to a namespace to determine how long a new data access request to a namespace would take to service. As a result of the logging of actually completed data access requests in step 344 along with the association of new data access requests with an estimated time to service, the power module can compile the workload for a namespace. That is, the combination of previously satisfied data access requests and estimated time to service new requests provides enough information for a power module to determine the workload for a namespace. Hence, the power module generates and maintains a workload value for each namespace that corresponds to how long a data access request takes to be satisfied. A namespace workload further corresponds to the memory cell operational performance of a namespace as well as the current channel and processor capabilities that service memory cells of a namespace.

With the logging of actual request satisfaction times in step 344 and the association of future requests with request satisfaction times in step 346, the power module can compile workload values over time for each namespace of a device/system. The tracking of workloads to various namespaces allows the power module to identify various workload patterns that reliably indicate future data access request satisfaction times, processing requirements, and buffer memory requirements in step 348. The combination of the determination of namespace workload and the association of workload patterns with future namespace time to satisfy a data access request provides ample information for the power module to correlate current namespace workload with an impact to predetermined namespace operational performance and/or power consumption expectations in step 350, such as QoS, deterministic window, error rate, and average data access latency.

Through the tracking of workloads and correlation of those workloads with impact to predetermined namespace operational performance, the power module can rank the various available namespaces in step 352 with the aid of the ranking circuit. Such namespace ranking can organize namespaces by availability, efficiency, reliability, read performance, or write performance. For instance, the power module can rank namespaces in step 352 by which namespaces can service a request most quickly (availability), with least processing and/or power consumption (efficiency), with least error rate (reliability), read request latency, average request service time, or write request latency. The ranking of namespaces allows the power module to generate and adjust namespace optimization strategy policy actions that provide the greatest opportunity to satisfy performance expectations in view of current and future predicted namespace workloads.

Figure 17:
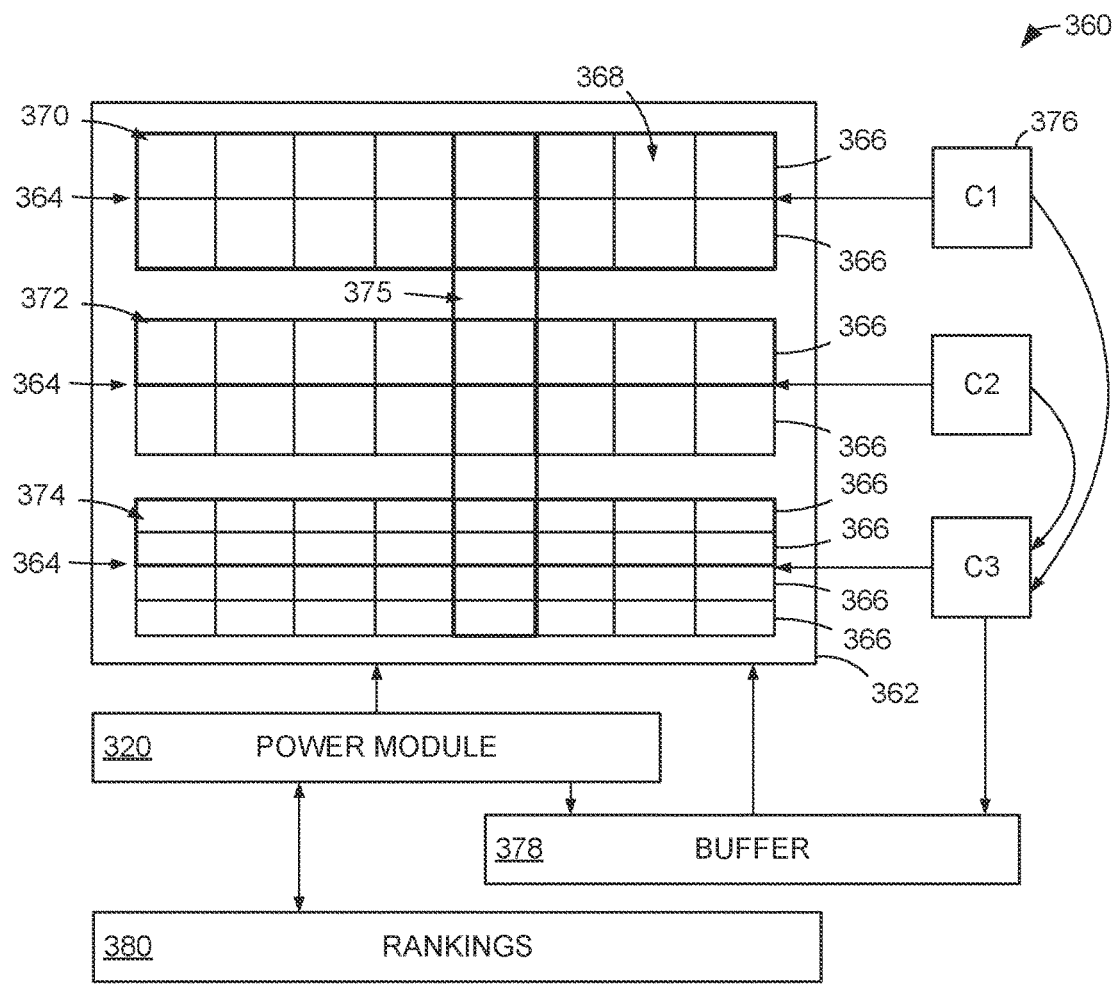
FIG. 17 depicts a block representation of portions of an example data storage system configured and operated in accordance with some embodiments.

FIG. 17 depicts a block representation of portions of an example data storage device 360 configured and operated in accordance with various embodiments. The device 360 consists of at least one solid-state memory 362 connected to a power module 320. The memory 362 is physically arranged into a plurality of different die 364 that each have a number of planes 366 consisting of blocks 368 of memory cells. It is noted that blocks of memory cells can be replaced by pages of memory cells without altering the organization or function of the memory. It is contemplated that some planes 366 are configured with single level cells that have two logical states while other planes 366 have multi-level cells that have more than two logical states.

The connected power module 320 can generate, manage, and track various namespaces 370, and 372 and 374. In the non-limiting example shown in FIG. 17, the power module 320 assigned the respective namespaces 368, 370, and 372 and 374 to each be contained within a particular die 364. The namespace 370 spans both planes 366 of the first (topmost) die 364 while namespaces 372 and 374 each span less than all the planes 366 of the respective second and third (middle and lowermost) dies 364. Through the execution of a namespace power strategy prompted by the detection, or prediction, of a namespace workload reaching a predetermined trigger, the power module 320 can modify which memory cells are allocated to a namespace. As such, the power module 320 can create, or alter, a namespace to span multiple separate memory dies 364, such as represented by namespace 375. The adaptive allocation of memory cells to a namespace is a non-exclusive namespace operational policy action that can control the power consumed in the satisfaction of a workload as well as the availability, efficiency, and reliability of the namespace as a whole.

The power module 320 can also conduct namespace operational policy actions that involve the organization of pending data access requests and/or data to effect a power consumption change. For instance, data requests, and the constituent data, can be moved between channels 376 corresponding to different namespaces, as illustrated by arrows in FIG. 17. It is contemplated that the power module 320 can reorganize requests, and data, in a single channel 376 without movement to a different channel 376. A non-limiting example of channel management provides operational policy change actions involving direct throttling of queued data access requests by inserting delays, or deactivating, a channel 376, prioritizing requests by reorganizing requests conducted on one or more channel 376, or executing read, or write, requests only for a predetermined length of time. Indirect channel 376 throttling can involve redirecting signals and/or data access signals to a channel 376 that expends available power to accomplish and cuts the available power for other channels 376, which indirectly slows the power consumption and data access performance of those other channels 376.

Some embodiments of channel management provide namespace operational changes that correspond with altered power consumption characteristics actions by utilizing new hardware channels 376 to redundantly service one or more namespaces. The channel management may also involve moving data associated with data access requests between different cache/buffer memories 378, as directed by the power module 320. The ability to throttle data, alter channel operation, alter what type of memory cell data is stored, and alter the allocation of memory cells to assorted namespaces, allows the power module 320 to conduct robust reactive and proactive behavior based on predetermined data locations to induce more favorable namespace performance over time with power optimized for the workload being experienced. It is noted that optimized power can be characterized as sufficient electrical power to provide data access performance that satisfies predetermined expectations, such as QoS or IOD, without expending superfluous amounts of electrical power without a tangible data access performance result.

Figure 18:
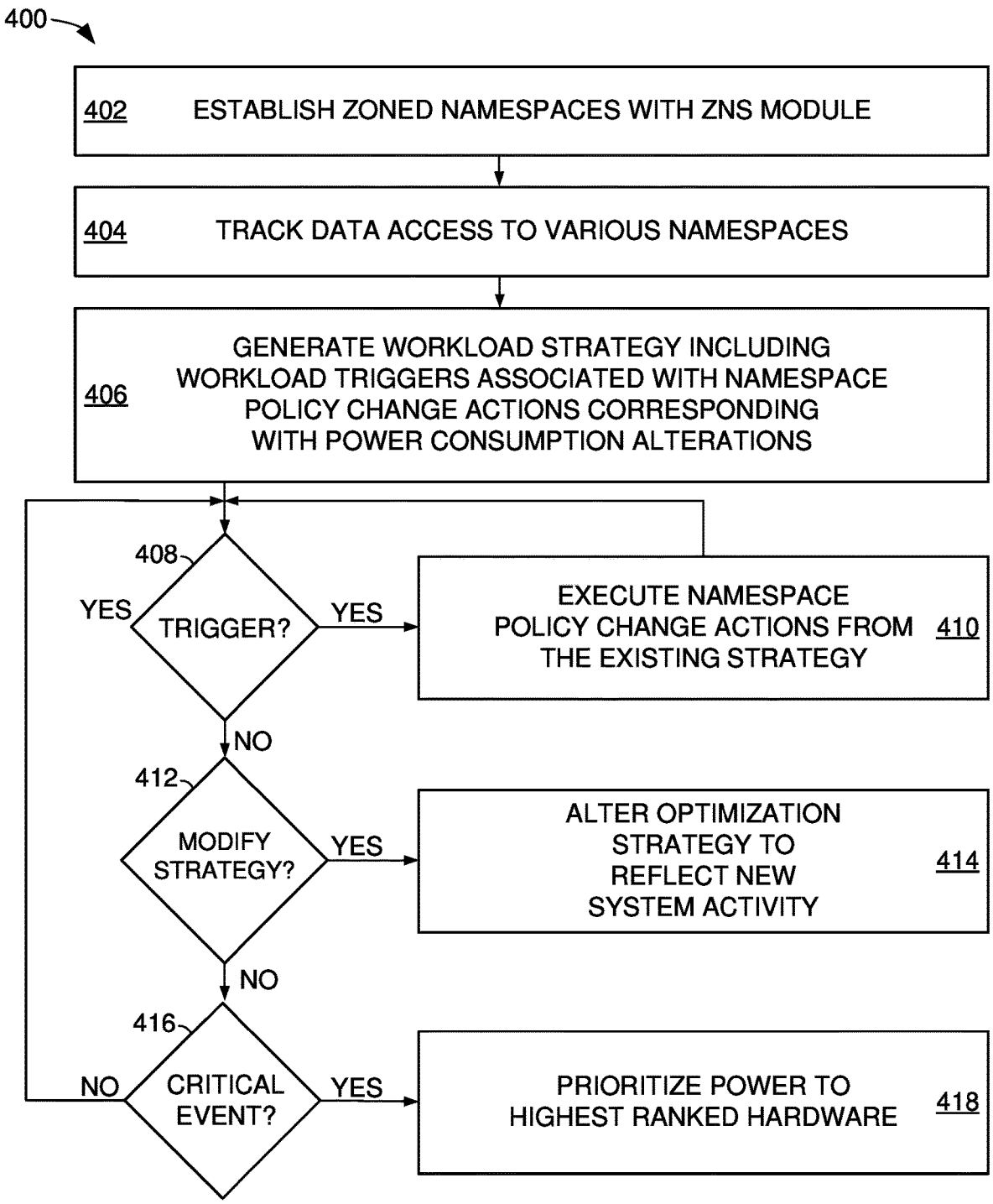
FIG. 18 is a flowchart of an example dynamic power routine that can be carried out with various embodiments of FIGS. 1-17.

FIG. 18 depicts an example workload-based namespace power consumption optimization routine 400 that can be carried out with the assorted embodiments of FIGS. 1-17. Initially, a data storage system is connected to a power module and initialized to service data access requests from hosts external to the memory, such as a third-party user. The power module establishes zoned namespaces in step 402 that can occupy any physical and logical data block addresses in one or more data storage devices, die of memory cells, and planes of memory cells. Activity to the zoned namespaces established in step 402 is subsequently tracked in step 404 by the power module to determine the capabilities, current performance, and operational configuration of the memory cells of the assorted namespaces. It is noted that the power module can track any number of different data access and memory behavior metrics over time.

The tracked data access activity and memory characteristics compiled by the power module from step 404 allows the power module to assign workload values to the respective namespaces that correspond with at least the volume of data accesses conducted on a namespace for a given length of time. An assigned namespace workload value may be more sophisticated, as directed by the power module, and can include a compilation of memory cell efficiency and/or reliability with availability. The ability to adapt the tracking of activity for a namespace and the generation of a workload value for the namespace allows the power module to conduct more, or less, rigorous processing and time to determine how much capability of a namespace is occupied by data access operations initiated by external hosts as well as background memory operations, such as garbage collection, memory refresh, and data mapping.

The generated workloads are monitored over time by the power module while a workload strategy is generated in step 406. The workload strategy establishes when various namespaces can benefit from reactive and/or proactive operational policy changes that provide power consumption savings and sets a workload trigger to prompt execution of at least one policy change action as prescribed by a power strategy. With one or more workload triggers set for each namespace while each namespace workload is compiled and tracked by the power module, decision 408 can determine if a workload trigger has been met, is imminently met, or is predicted to be met with a sufficiently high reliability. That is, the power module can associate workload values for the assorted namespaces of a data storage system with workload trigger thresholds that can be previously, currently, or likely met, which prompts step 410 to execute one or more namespace operational policy change that alters the power consumption of at least one memory cell in response to the workload trigger being met.

The execution of a namespace operational policy change can involve a diverse variety of actions, such as throttling data accesses, altering queued requests organization, changing between sequential and random writes and/or reads, changing buffer locations for data, transitioning memory cells from multi-level to single level, indirect throttling of channels, direct throttling of channels and/or queues with intentional delays, deactivation of hardware, re-classifying memory blocks, altering GCUs, and altering where and how frequently accessed data is stored. The reactive or proactive nature of the policy change actions in step 410 can be conducted any number of times as routine 400 returns to decision 408 to monitor if a workload trigger is reached.

While decision 408 monitors namespace workload over time for triggers, decision 412 can evaluate if an existing workload and/or namespace power strategy can be improved through modification. The evaluation of decision 412 can involve comparing recent workload activity with the activity predicted when the workload and power strategies were generated. Alternatively, decision 412 can involve comparing current memory performance with the performance capabilities when the workload and power strategies were generated. A determination that the current strategies are not optimal for the current and predicted namespace workloads and/or memory cell capabilities prompts step 414 to alter at least the power strategy to reflect the new system conditions. It is noted that step 414 may generate a completely new strategy, or simply modify one or more namespace operational policy change actions that correspond with altered power consumption characteristics.

A power module may also passively evaluate if an inadvertent and/or unscheduled critical event, such as power loss, hardware failure, or software failure, is imminent. That is, the power module can determine that a critical event is imminent and utilizes the remaining stored energy in the highest ranked namespaces with the highest ranked hardware before failure to carry out a pending data reads or data writes on a prioritized basis in step 418. The prioritizing of data reads or data writes via power redistribution in a device and/or system can be predetermined by the power module in order to be efficiently carried out with the minimal time and power remaining before the occurrence of a critical event.

Through the various embodiments of a power module being employed in a data storage system, namespace configuration and operation can be intelligently manipulated based on encountered workload to provide optimal power consumption and minimal heat production for a memory, device, and system. By intelligently compiling namespace workloads and setting predetermined workload triggers, the power module can efficiently carry out prescribed actions that modify namespaces themselves and/or how data is handled flowing into, or out of, a namespace to change how much power is consumed to maintain predetermined data access performance. The alteration of namespace operation in response to workloads tracked by the power module ensures that executed actions provide a practical balance between expended system processing resources and increased capability to satisfy namespace performance expectations with minimal power consumed.

What is claimed is:

1. An apparatus comprising:
a plurality of memory cells arranged into a plurality of logical namespaces, each logical namespace of the plurality of logical namespaces sequentially written and entirely erased as a single unit, each of the memory cells in each logical namespace further configured to store at least N bits per cell where N is a plural number; and
a power module comprising at least one programmable processor circuit and associated program instructions stored in a memory connected to the plurality of memory cells arranged into the plurality of logical namespaces, the power module configured to alter an operational parameter of at least one logical namespace of the plurality of logical namespaces in response to a predetermined threshold workload trigger being met, the operational parameter alteration executed to reduce power consumption of the plurality of memory cells while maintaining a data storage performance metric for the plurality of memory cells in a predetermined range, the operational parameter alteration transitioning at least selected memory cells in the at least one logical namespace used to store current version user data to a lower level of logical storage to reduce the total number of logical states stored in the at least selected memory cells to a level of N−1 bits per cell, the operational parameter alteration further throttling a rate at which data access requests are supplied to a channel circuit corresponding to the at least one logical namespace.

2. The apparatus of claim 1, wherein the predetermined threshold workload trigger comprises a predicted or detected number of errors.

3. The apparatus of claim 1, wherein the predetermined threshold workload trigger comprises an amount of available memory.

4. The apparatus of claim 1, wherein the power module further operates to generate a workload strategy, predict the predetermined threshold workload trigger being met, the operational parameter alteration further comprising altering which memory cells among the plurality of memory cells are allocated to the at least one logical namespace, accumulating write data in a buffer coupled to the channel, and writing the write data to the at least one logical namespace using the channel.

5. A method comprising:
allocating a plurality of memory cells located in different data storage devices into a plurality of logical namespaces, each logical namespace of the plurality of logical namespaces sequentially written and entirely erased as a single unit, each of the memory cells in each logical namespace configured to store at least N bits per cell where N is a plural number;
generating a workload strategy with a power module connected to the plurality of memory cells arranged into the plurality of logical namespaces, the workload strategy comprising at least one operational trigger, the power module comprising at least one programmable processor with associated program instructions stored in a local memory;
predicting a workload to a selected logical namespace of the plurality of logical namespaces with the power module; and
altering an operational parameter of the selected logical namespace in response to the predicted workload meeting the at least one operational trigger, the operational parameter alteration executed to reduce power consumption of a data storage device while maintaining a data storage performance metric of the plurality of memory cells in a predetermined range, the operational parameter alteration comprising reallocating a group of the memory cells from another of the logical namespaces to the selected logical namespace, and reducing the total number of logical states stored in the memory cells of the selected logical namespace to a level of N−1 bits per cell, and throttling a rate at which data requests are supplied to a channel coupled to the selected logical namespace to reduce power consumed by the selected logical namespace.

6. The method of claim 5, wherein the workload strategy prescribes altering a workload detection granularity.

7. The method of claim 5, wherein the workload strategy correlates data access patterns to the plurality of logical namespaces to a real-time workload for each logical namespace of the plurality of logical namespaces.

8. The method of claim 5, wherein the power module predicts an impact of the workload on a plurality of different operational parameter alterations prescribed in the workload strategy.

9. The method of claim 5, wherein the power module ranks the plurality of logical namespaces by predicted power consumption for different data storage performance.

10. The method of claim 5, wherein the power module maps electrical power consumption for different physical locations of the plurality of memory cells and enacts the operational parameter alteration in response thereto.

11. The method of claim 5, wherein the operational parameter alteration further diverts activity to at least one hardware channel to utilize more electrical power and increase data access performance bandwidth to at least one memory cell of the plurality of memory cells.

12. The method of claim 5, wherein the operational parameter alteration throttles operation of at least one memory cell of the plurality of memory cells by inserting a delays between execution of queued data access requests supplied to the channel.

13. The method of claim 5, wherein the plurality of memory cells are disposed on semiconductor dies among the respective data storage devices, wherein the selected logical namespace spans a first set of the semiconductor dies prior to the operational parameter alteration, and wherein the selected logical namespace spans a different, second set of the semiconductor dies after the operational parameter alteration.

14. A method comprising:
allocating a plurality of memory cells located in different data storage devices into a plurality of logical namespaces, each logical namespace of the plurality of logical namespaces sequentially written and entirely erased as a single unit, each of the memory cells in each logical namespace configured to store at least N bits per cell where N is a plural number;
generating a workload strategy with a power module connected to the plurality of memory cells that are arranged into each plurality of logical namespaces, the workload strategy comprising at least one operational trigger, the power module comprising at least one programmable processor with associated program instructions stored in a local memory;
classifying the plurality of memory cells with the power module with respect to power consumption compared to data storage performance;

detecting a workload to a logical namespace of the plurality of logical namespaces meeting the at least one operational trigger with the power module;

selecting, with the power module, an operational parameter to alter to reduce power consumption by the plurality of memory cells;

choosing, with the power module, a selected logical namespace of the plurality of logical namespaces to execute the selected operational parameter alteration from the classified plurality of memory cells; and altering the selected operational parameter of the selected logical namespace by reallocating a group of the memory cells from another of the logical namespaces to the selected logical namespace, reducing the total number of logical states stored in the memory cells of the selected logical namespace to a level of N−1 bits per cell, and throttling a rate at which queued data access requests are supplied to a channel coupled to the selected logical namespace by inserting delays between the queued data access requests, the channel configured to direct read and write operations upon the memory cells of the selected logical namespace responsive to the queued data access requests.

15. The method of claim 14, wherein the plurality of memory cells are classified in accordance with a power strategy generated by the power module.

16. The method of claim 15, wherein the power strategy correlates operational parameter alterations to the plurality of logical namespaces to impact on electrical power consumption and data storage performance.

17. The method of claim 16, wherein the power module selects the operational parameter alteration to provide a predetermined ratio of memory cells of the plurality of memory cells operating at maximum data storage performance to memory cells of the plurality of memory cells operating with minimum electrical consumption.

18. The method of claim 16, wherein the power strategy correlates electrical power consumption with heat generated by the plurality of memory cells.

19. The method of claim 14, wherein the operational parameter alteration is selected to satisfy a predetermined Quality of Service (QoS) standard with minimum power consumption by the plurality of memory cells.

20. The method of claim 14, wherein the operational parameter alteration is selected to satisfy a predetermined deterministic input/output window with minimum power consumption by the plurality of memory cells.

* * * * *